(No Model.)

C. H. LAMSON.
CARRIER ATTACHMENT FOR BICYCLES

No. 253,211. Patented Feb. 7, 1882.

WITNESSES
Frank N. Bacon
Ernest R. Benson

INVENTOR
Charles H. Lamson,
By Charles E. Pratt,
Atty.

UNITED STATES PATENT OFFICE.

CHARLES H. LAMSON, OF PORTLAND, MAINE.

CARRIER ATTACHMENT FOR BICYCLES.

SPECIFICATION forming part of Letters Patent No. 253,211, dated February 7, 1882.

Application filed December 8, 1881. (No model.)

*To all whom it may concern:*

Be it known that I, CHARLES H. LAMSON, of Portland, in the county of Cumberland and State of Maine, have invented certain new and useful Improvements in Carrier Attachments for Bicycles, of which the following is a specification.

Heretofore carrier attachments for bicycles have been in use consisting of bags attached to the saddle or the front-wheel axle or other parts of the bicycle, or of braces attached to the perch above the rear wheel, or of a small metallic table or frame set upon the top of the head of the bicycle and held by the finishing-nut or otherwise thereon.

The object of my invention is to furnish a light and convenient movable carrier for bundles, books, or other small articles, which may be quickly placed in position on the head of the bicycle and as quickly removed, which may support its load in front of the head and out of the way of the body of the rider, which may securely hold the articles carried by it, and which may also serve as a handle or shawl-strap by which such articles may be taken and carried in hand when removed from the bicycle.

The nature of my invention will be obvious from the following description, taken in connection with the accompanying drawings, in which—

Figure 1:
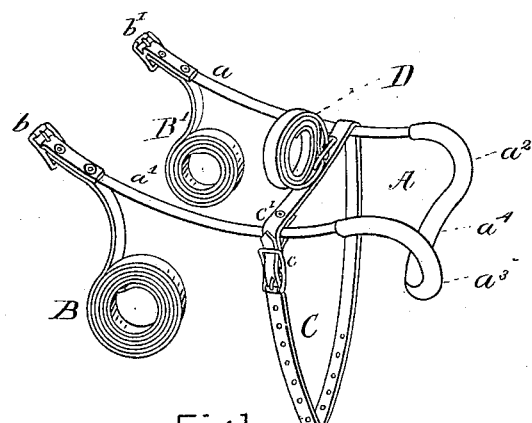
Figure 2:
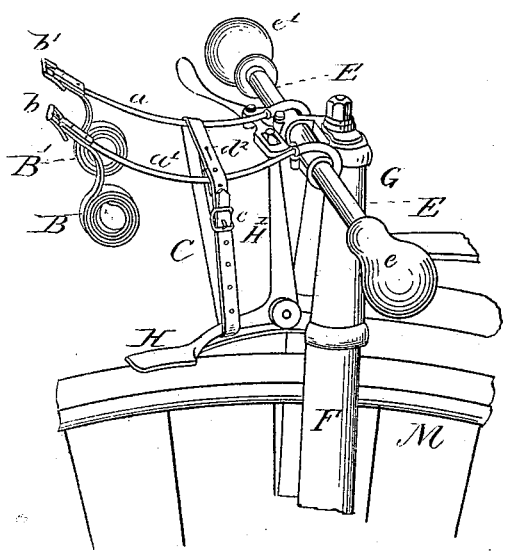
Figure 3:
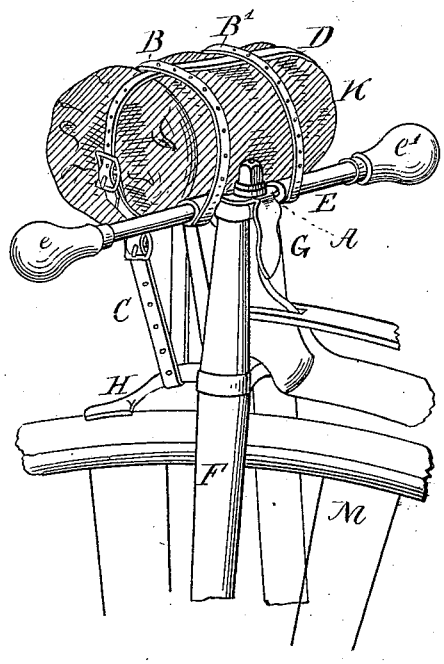

Figure 1 shows all the parts of a contrivance embodying my invention in half-perspective. Fig. 2 shows the same thing in place upon the head of a bicycle and ready to receive its load, one part being removed and shown in detail above. Fig. 3 shows the same thing in place on the head of a bicycle and with a bundle secured thereon.

A is a frame, which is made of metal, and which has arms $a$ $a'$, to which straps B B' are riveted or otherwise attached with buckles $b$ $b'$. The arms $a$ $a'$ are designed for supporting the bundle or load to be carried, and I generally make them substantially parallel. The frame has bends or curved parts $a^2$ $a^3$, adapted to partly inclose and rest upon the bicycle handle-bar E, or the lugs which support the handle-bars, as shown in Fig. 2, and it has also a stop or other bent part, $a^4$, adapted to rest against the head of the bicycle below the handle-bar and its lugs, as shown in the drawings, and which stop prevents the pressing down too far of the arms under the weight of their load. These arms, as I make them, are of such size as to be elastic under the load, though this is not necessary.

B B' are straps, which may be attached to the arms $a$ $a'$, and which are long enough to encircle any ordinary bundle that may be attached, and have buckles $b$ $b'$ at one end and holes for the tongues thereof distributed toward the other end.

C is a stay-strap or steadying device, which may be fastened to the arm $a'$, passing across the arms and under the brake H, and so, when buckled as at $c$, serves to steady the frame and the bundle and prevent them from jarring upward.

D is another strap (which may be used, when carrying books or otherwise when necessary, as a cross-strap) having a buckle, $d$, and which I generally attach by means of a button, $d'$, which may be made to engage in a button-hole, $d^2$, in the strap C.

G is the head of a bicycle; F, the fork; M, the wheel; E E, the handle bar or bars; and $e$ $e'$ are the handles.

K is a bundle.

This carrier may be used without the straps C and D, as it will stay in place and serve substantially all the purposes for ordinary uses without them; but as a matter of convenience and for greater security the stay-strap C is desirable, and the cross-strap D is also desirable when two or more articles are carried at the same time, or when it is necessary to keep the bundle compact.

To place the carrier in position the straps are loosened, the frame is turned over, and one of the arms passed around the head below the handle-bar until the stop $a^4$ is against the front side of the head and the arms extend backward toward the seat. The arms are then carried upward and forward until in position as shown in Fig. 2. If the steadying-strap C be used, it is then buckled in position as shown in Fig. 2, and if it be desired to use the cross-strap D, that is placed in position as shown in Fig. 1, but uncoiled; but whether these two last-named straps be used or not, the bundle is placed on the arms $a$ $a'$, the straps B B' are carried under the bundle and under the handle-bar E E, one on either side the head, then are brought over the bundle and buckled in the position in which they appear in Fig. 3. In securing the cross-strap D, I pass the ends either over or under the arms $a\ a'$, and then about the bundle or other articles, as shown in Fig. 3.

I do not mean to limit myself to the precise form or construction shown in the drawings, or to any particular material. It is only necessary that the frame be rigid and the straps flexible. I sometimes make the frame jointed at $a^2\ a^3$, for convenience of folding up and putting in the pocket or in a bag, though it will fold very compactly without.

This carrier I use as a handle or shawl-strap for carrying bundles of small articles off from the bicycle, passing the straps about them in the usual way, and using the stop part $a^4$ as a handle.

I sometimes cover the curved parts $a^2\ a^3\ a^4$ with rubber tubing, as shown in the drawings, though this is not necessary, but is desirable to prevent the metallic parts from being injured or defaced by chafing together.

I claim as new and of my invention—

1. The described metallic frame for a bicycle bundle-carrier, constructed with arms $a\ a'$, curved rests $a^2\ a^3$, and a stop, $a^4$, substantially as shown and described.

2. A bicycle bundle-carrier consisting of a metallic frame, A, having arms $a\ a'$, curved rests $a^2\ a^3$, and stop $a^4$, and straps B B', connected therewith, constructed and combined essentially as set forth.

3. In a bicycle bundle-carrier having arms $a\ a'$ to support a load and means of attachment to the head of a bicycle, the steadying-strap C, constructed and adapted substantially as set forth.

4. In combination with a bicycle bundle-carrier having a frame, A, and straps B B', a cross-strap, D, constructed and adapted substantially as and for the purposes set forth.

5. A bundle-carrier consisting of a frame, A, and straps B, B', and D, substantially as herein described and shown.

6. In combination with a bicycle head and handle-bar, the arms $a\ a'$ and straps B B', essentially as set forth.

CHARLES H. LAMSON.

Witnesses:
FRANK W. WOODMAN.
A. R. HARMON.